May 9, 1933.  H. N. SMITH  1,907,600
MACHINE FOR MAKING FRICTION ELEMENTS
Filed Oct. 24, 1929   3 Sheets-Sheet 1
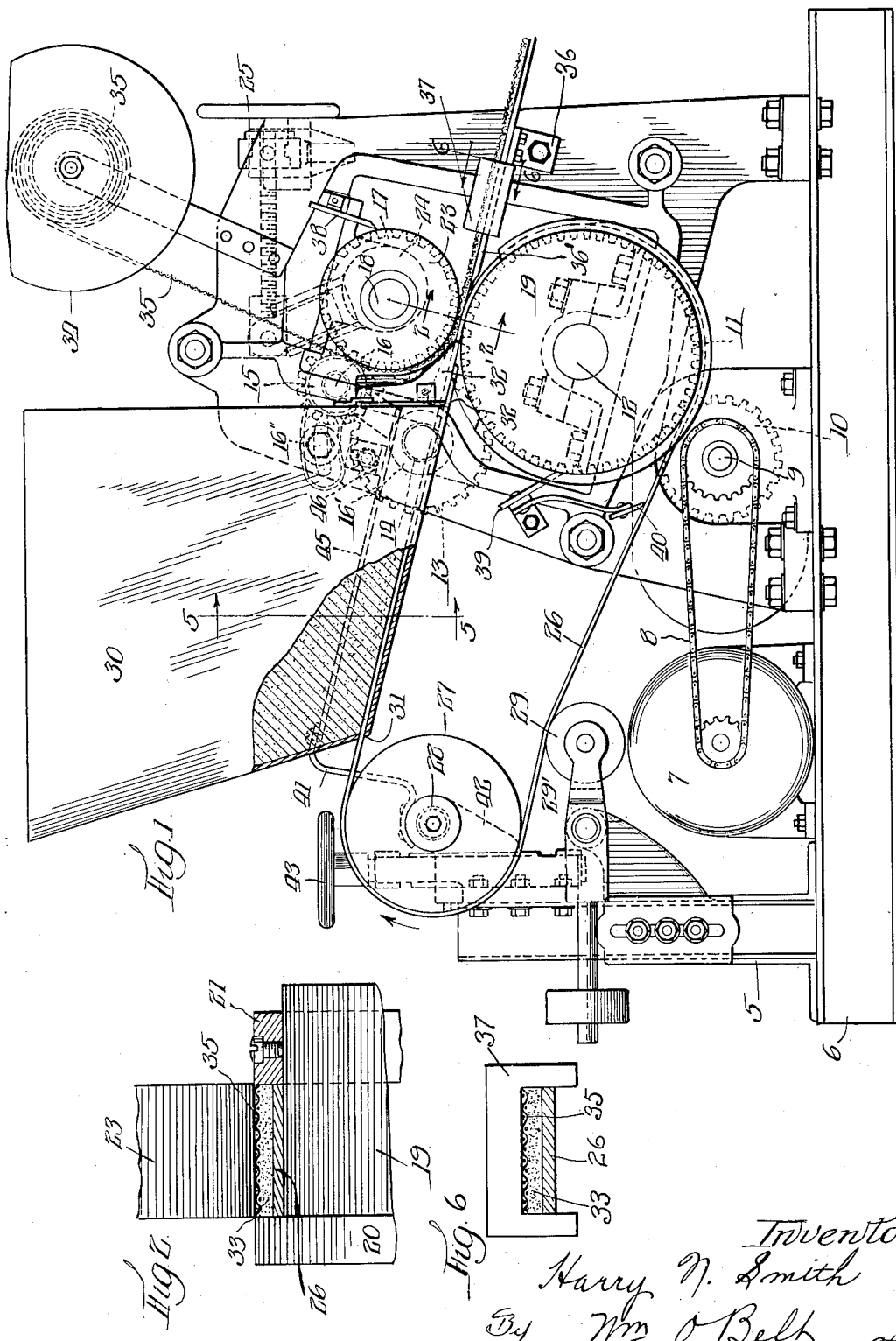
Inventor:
Harry N. Smith
By Wm. O. Belt  atty.

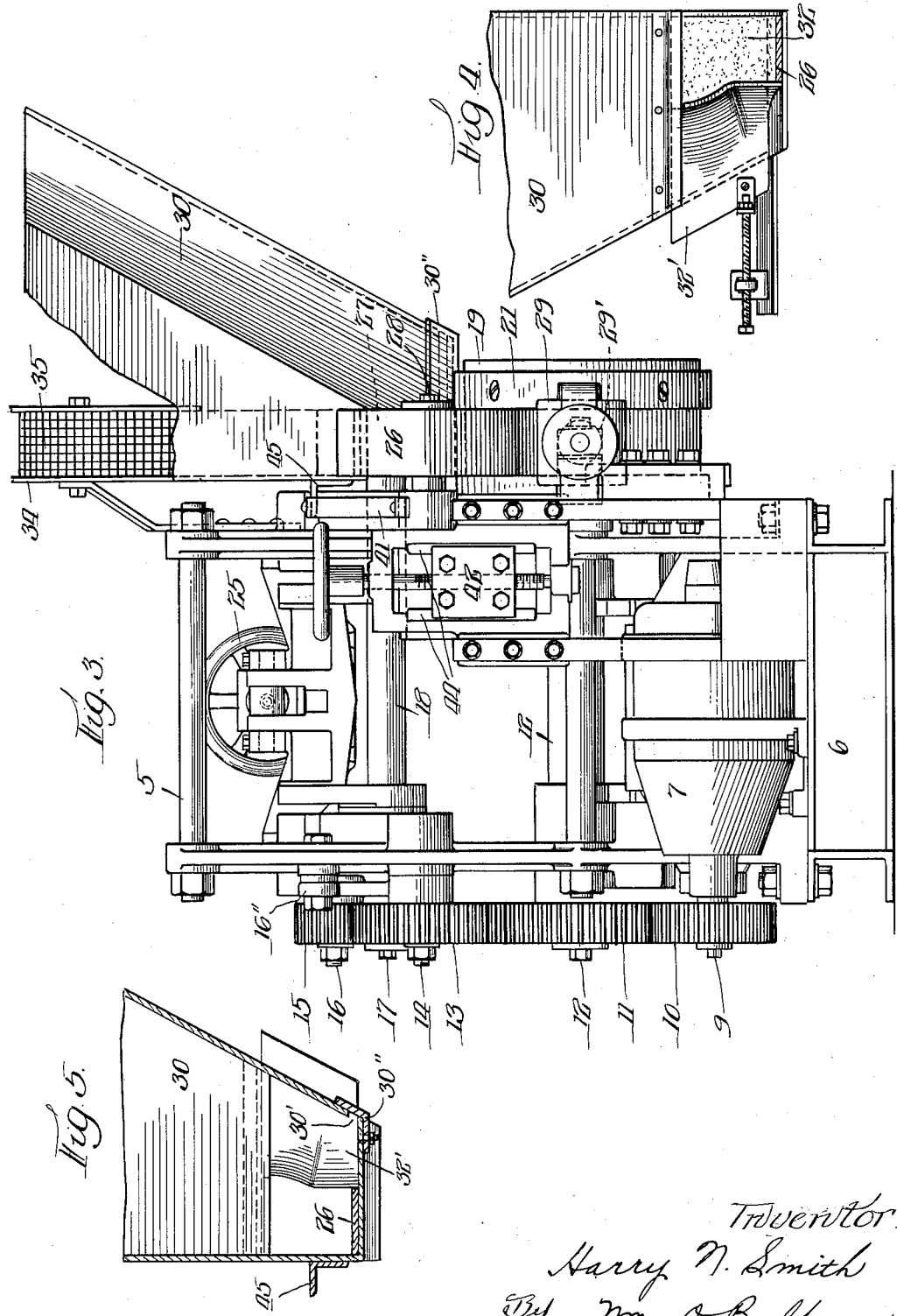

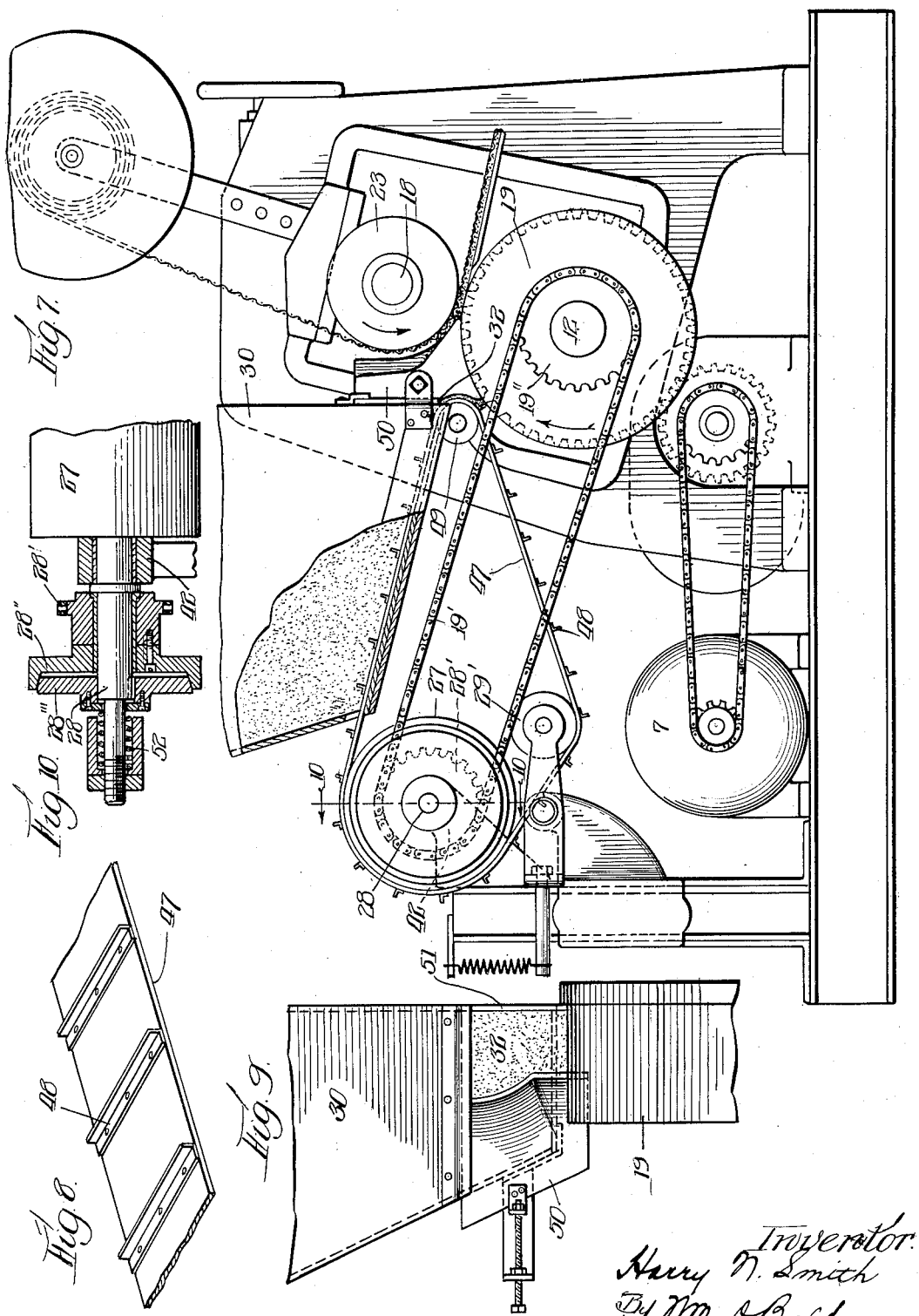

Patented May 9, 1933

1,907,600

UNITED STATES PATENT OFFICE

HARRY N. SMITH, OF DETROIT, MICHIGAN, ASSIGNOR TO AMERICAN BRAKEBLOK CORPORATION, OF NEW YORK, N. Y., A CORPORATION OF NEW YORK

MACHINE FOR MAKING FRICTION ELEMENTS

Application filed October 24, 1929. Serial No. 402,100.

This invention relates to machines for making composition friction elements like, for example, that described in the application of William A. Blume, Serial No. 396,936, filed October 2, 1929.

The object of the invention is to provide a machine of simple construction for molding the composition material into strip form adapted to be cut into liner or block lengths ready for curing.

Another object of the invention is to apply a flexible backing to the composition strip as it is molded in the rolling operation.

A further object of the invention is to provide means for automatically feeding the composition material from the hopper to the bight of the molding rolls in substantially uniform quantity for making a strip of the desired cross section.

And further objects of the invention are to provide a machine of simple construction and compact arrangement which operates automatically to feed and mold the composition material, which can be readily adjusted to mold strips of different cross section, and which is otherwise conveniently constructed and adapted for performing the required operations.

I have illustrated the invention in a selected embodiment in the accompanying drawings in which Fig. 1 is a right side elevation of the machine, partly broken away and in section.

Fig. 2 is a detail sectional view on the line 2—2 of Fig. 1.

Fig. 3 is a rear end elevation of the machine.

Fig. 4 is a detail enlarged view showing the throat of the hopper and the gate for controlling the flow of material therethrough.

Fig. 5 is a detail transverse sectional view on the line 5—5 of Fig. 1.

Fig. 6 is a detail sectional view on the line 6—6 of Fig. 1.

Fig. 7, partly broken away and in section, illustrates an embodiment of the invention having a cleated feeder belt or carrier.

Fig. 8 is a detail enlarged view of a portion of the cleated feeder belt.

Fig. 9 is a detail enlarged view showing the throat of the hopper and the gate as used in the construction of Fig. 7.

Fig. 10 is a sectional view on the line 10—10 of Fig. 7.

Referring to the drawings the machine comprises a frame 5 of suitable construction and including a body 6. A power motor 7 is mounted on the base and through the chain 8 drives the main power shaft 9. A gear 10 on shaft 9 drives a gear 11 on shaft 12 and the latter gear drives idle gears 13 on shaft 14 and 15 on shaft 16. The latter gear drives gear 17 on shaft 18. The shaft 12 carries a lower forming roll 19 in fixed position. This forming roll has a flange 20 at one end and a collar 21 is movably mounted on the roll to vary the width of the liner strip 22 being formed. The shaft 18 carries an upper forming roll 23 which fits between the flange 20 and the collar 21 on the roll 19 and is adapted to be adjusted vertically to vary the thickness of the liner strip 22 being formed. This adjustment is effected by mounting the upper forming roll shaft 18 in eccentric bearings 24 in the frame, these bearings being capable of adjustment by operating the hand screw adjustment device 25. When the upper roll 23 is adjusted it will be desirable to adjust idle gear 15 relative to gears 13 and 17 and for this purpose shaft 16 is carried by angle arms 16' which are secured in adjusted position at 16'' on the frame. An endless feeder belt 26 travels on the lower forming roll 19 between the flange 20 and the collar 21 and over the roll 27 mounted on a shaft 28. A belt tightener roll 29 is mounted on a counter-weighted lever 29' or its equivalent which is pivotally mounted on the frame and supports the roll in contact with the feeder belt to hold it taut. This feeder belt enters the rear end of the composition hopper 30 through a slot 31 at the bottom of the hopper and travels along on the bottom of the hopper to a throat 32 at the front end of the hopper. The material is carried on by the feeder belt from the throat of the hopper into the bight between the rolls 19 and 23 as indicated at 33, Fig. 2. Any suitable gate device 32', Fig. 4, may be provided at the throat for controlling the quantity of composition material to be carried by the feeder belt from the hopper to the rolls. A reel 34 is mounted on the frame to carry a roll of backing material 35 which is fed between the rolls with the material and is embedded in the material on one face thereof as indicated in Fig. 2. Different kinds of backing material may be used but I have found it convenient and satisfactory to provide woven wire mesh of relatively light gauge and small openings. The machine may be easily adjusted for making a strip of a different width by providing a supply of backing material of the proper width and an upper roll of the proper width and by adjusting the collar 21 with reference to the backing and the upper roll to form a mold cavity between the upper roll, the feeder belt, the flange 20 and the collar 21. A feeder belt should be used of approximately the width of the mold cavity, as indicated in Fig. 2, and provision is made for bodily moving the feeder belt sideways through a slot 30' at the bottom of the outer side of the hopper, Fig. 5. This slot is normally closed by a removable angle strip 30''. The gate device 32' is provided with means for laterally adjusting it to approximately the width of the feeder belt, Fig. 4. While I prefer that the backing material shall be of the same width as the friction element to be produced and that the feeder belt shall be of the same width this is not absolutely necessary and there may be variations in width within reasonable limits and still produce a satisfactory product. On a bracket 36' on the machine I mount a stripper 36, Fig. 1, with an edge directed between the molded part and the top portion of the lower roll to insure stripping the product from the feeder belt on the lower roll. This stripper is preferably projected for some distance away from the rolls to support the material as it comes from the rolls for delivery to a table or other support, or to a cutting machine as shown in my companion application Serial No. 399,530, filed October 14, 1929. I also provide a floating wiper 37 which rests upon the product and abuts the bracket 36'. This wiper smooths down any fins that may be present at the edges of the product and may also serve to wipe off any material that may be lodged on the top of the product as it leaves the mold machine. The wiper is preferably made of metal and of sufficient weight to co-operate with the stripper to confine the product after it leaves the rolls and to prevent any tendency of the composition to swell after rolling, thereby assisting to size the product as to thickness and insure fairly accurate and uniform thickness. I also preferably provide scrapers 38 for the upper roll, 39 for the lower roll, and 40 for the feeder belt to remove any of the composition material which may be carried thereby beyond molding position. The flow of composition material through the throat can be very materially controlled to respond to the speed of the machine or for molding strips of different sizes by tilting the hopper and for this purpose the rear end of the hopper is supported by an arm 41 which is mounted on a bracket 42 adapted to be adjusted by a screw 43 in guides 44 on the frame. The shaft 28 carrying roll 27 is mounted on the bracket 42 so that it will be adjusted with the hopper. The angle strip 45 is fastened on the inner side of the hopper and an angle plate 46 is fastened to the angle strip and is adjustably fastened to the frame, Fig. 1. This provides for adjustably supporting the hopper at its rear end and at its front end in any desired tilted position within the limits of adjustment for controlling the flow of composition material from the hopper through the bight into the molding cavity.

My invention provides a machine of simple and compact construction for making liner strips rapidly and uniformly in predetermined width and thickness. The strip is formed or molded in a rolling operation and at the same time the backing is embedded therein. This backing may be of any suitable reticulated material or fabric including wire mesh and woven fabric. The upper forming roll is preferably knurled for feeding the backing from the reel through molding position. A relatively stiff flexible backing may be used but generally speaking the backing will be of such character that the strip liner issuing from the machine will be limber. The strip liner may be carried away from the machine in a straight length and preserved in long lengths for future operations or it may be cut into liner lengths and mounted on forms for the curing operation. After the machine is started in operation it requires only that the product be properly taken away from the machine and the hopper be refilled when required to carry on the operation indefinitely and provision may be made for delivering the liner strip directly from this molding machine into the curing oven. This invention provides highly efficient means for producing the liner strips at a relatively low manufacturing cost.

In Fig. 7 I have shown a feeder or carrier belt 47 having thereon a plurality of spaced cleats 48 which drag the material forward from the bottom of the hopper and deposit it between the throat 32 of the hopper 30, the upper forming roll 18 and the lower forming roll 19. In this case the belt does not travel around the lower forming roll but travels on a small roll 49 supported in the frame below the lower front end of the hopper. The gate device 50 and the opposite side 51 of the hopper are extended down approximately to the lower forming roll 19 to confine the material in the space between themselves, the hopper, the roll 49 and the forming rolls so that it will be carried forward between the forming rolls as heretofore described by the movement thereof. It will be noted that the center of the upper forming roll is offset forwardly of the center of the lower forming roll so that the material carried forward by the feeder belt is supported on the lower forming roll and is carried forward thereby. In this construction the belt tightener roll 29' is supported to engage the inside of the belt and the roll 27 drives the belt. A sprocket chain 19' is driven by a sprocket wheel 19'' on the shaft 12 and, in turn, drives a sprocket wheel 28' on the shaft 28, Fig. 10. A clutch member 28'' is fastened to the sprocket 28' and both float on the shaft 28. The other member 28''' of the clutch is keyed to the shaft 28 and is normally pressed in operative engagement with the member 28'' by spring 52. In other respects the embodiment in Figs. 7, 10, is the same or substantially the same as that heretofore described and therefore I have not considered it necessary to show more detail of the machine in Fig. 7. As the material is fed through the hopper gate or throat by the cleated belt 47 the material may pile up in the bight of the forming rolls faster than it will be taken away, in which case the feeding movement of the belt will be retarded and the clutch will slip until the pressure is relieved and then the clutch will take hold again and the belt will resume its feeding action.

I have shown the invention in embodiments which I have found satisfactory for commercial use but I am aware that changes in the form, construction and arrangement of parts may be made to satisfy different conditions and requirements and I reserve the right to make all such changes as fairly fall within the scope of the following claims.

I claim:

1. In a machine for making composition friction elements, the combination of a material receiving hopper, lower and upper forming rolls, an endless belt traveling through the hopper on the bottom thereof and around guiding pulleys therefor disposed on one side of said lower and upper forming rolls, means for driving the lower forming roll, and means for driving the belt from the lower forming roll.

2. In a machine for making composition friction elements, the combination of a material receiving hopper, lower and upper forming rolls, an endless belt traveling through the hopper on the bottom thereof and around guiding pulleys therefor disposed at one side of said forming rolls, means for driving the lower forming roll, means for driving the belt from the lower forming roll, and means for guiding material from the hopper and on the belt to the forming rolls.

3. In a machine for making composition friction elements, the combination of a material receiving hopper, a pair of forming rolls, means traveling through the hopper for carrying material from the hopper to the forming rolls, one of said forming rolls having a peripheral flange, said one of said forming rolls having a collar thereon, said collar being adjustable on the roll relatively to the flange and cooperating with the flange in determining the width of the element being made, and means for positioning the other forming roll relative to the peripheral flange on one of said forming rolls whereby the forming roll positioned relative to said flange is extended between said flange and the collar to compress material passing between the rolls.

4. In a machine for making composition friction elements, the combination of a forming roll having a peripheral flange at one end, a collar adjustable on the roll relative to the flange to vary the width of the molding cavity of the roll, another forming roll arranged to operate between the flange and the collar of the first mentioned forming roll, permanently mounted means for positioning the other roll relative to said peripheral flange to insure positioning thereof between the flange and the collar, and means for adjusting said last mentioned forming roll bodily and relatively to the first mentioned forming roll to determine the thickness of the molding cavity.

5. In a machine for making composition friction elements, the combination of a material receiving hopper having slots at its front and back adjacent its bottom, an endless belt traveling through said slots and on the bottom of the hopper and having cleats thereon to insure movement of a substantially uniform quantity of material from the hopper, a guiding throat through which material moved through said belt is passed, and guiding rollers disposed on one side of said guiding throat and having said belt directed therearound whereby said belt continually passes material to said throat during operation thereof.

6. In a machine for making composition friction elements, the combination of a material receiving hopper, said hopper having slots at its front and back adjacent its bottom, a pair of forming rolls mounted in front of the hopper, an endless belt traveling through said slots and on the bottom of the hopper to carry material from the hopper and having cleats thereon to a guiding throat leading to the rolls, and guiding rollers disposed on one side of said guiding throat and having said belt directed therearound whereby said belt continually passes material to said throat during operation thereof.

7. In a machine for making composition friction material in a continuous strip, the combination of a material receiving hopper, a pair of rolls for forming material delivered from the hopper into a strip, means for delivering material from the hopper to the forming rolls, and a weighted floating wiper resting on the strip after it leaves the rolls and extending over the strip and past the edges thereof to smooth said strip to remove fins and the like therefrom as said strip moves therebelow after passage of said strip from said forming rolls.

8. In a machine for making composition friction material in a continuous strip, the combination of a material receiving hopper, a pair of rolls for forming material delivered from the hopper into a strip, means for delivering material from the hopper to the forming rolls, a support for the strip after it leaves the rolls, and a weighted floating wiper resting upon the strip on said support and extending over the strip and past the edges thereof to smooth said strip to remove fins and the like therefrom as said strip moves over said support.

9. In a machine for making composition friction material in a continuous strip, the combination of a material receiving hopper, a pair of rolls for forming material delivered from the hopper into a strip, means for delivering material from the hopper to the forming rolls, a bracket on the machine, a stripper mounted on the bracket and arranged to insure stripping of the strip from the lower roll, said stripper also forming a support for the strip after it leaves the rolls, and a weighted floating wiper resting upon the strip on the support and abutting said bracket, said wiper extending across said strip and past the edges thereof to smooth said strip and to remove fins and the like therefrom as said strip moves over said support.

10. In a machine for making composition friction elements, the combination of a material receiving hopper, an endless belt traveling through the hopper on the bottom thereof, lower and upper forming rolls, guiding pulleys for the endless belt and disposed on one side of said forming rolls, means for driving the lower forming roll, means for driving the belt from the lower forming roll, a reel containing a supply of backing material which is directed therefrom around upper forming roll to pass between the rolls whereby material fed from the hopper to said forming rolls is forced into said backing material during passage between said forming rolls.

11. In a machine for making composition friction elements, the combination of a material receiving hopper, an endless belt traveling through the hopper on the bottom thereof, cleats on said belt for moving material from said hopper, a lower forming roll, an upper forming roll cooperating with the lower forming roll and offset from vertical alignment with said lower roll, guiding pulleys for said endless belt and disposed on one side of said forming rolls, a guiding throat extending between the discharge end of said hopper and said lower forming roll for guiding material moved from said hopper to said forming roll, a reel containing a supply of backing material, said material being directed from said reel and around the upper forming roll whereby material passing between said forming rolls is forced into said backing material.

HARRY N. SMITH.